United States Patent
Chung et al.

(10) Patent No.: US 9,346,942 B2
(45) Date of Patent: May 24, 2016

(54) THERMOPLASTIC RESIN COMPOSITION AND MOLDED ARTICLE INCLUDING THE SAME

(71) Applicant: Samsung SDI Co., Ltd., Yongin-si (KR)

(72) Inventors: Yeon Wook Chung, Uiwang-si (KR); Yong Hee Kang, Uiwang-si (KR); Kyu Young Kim, Uiwang-si (KR); Byeong Yeol Kim, Uiwang-si (KR); Joong In Kim, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/554,195

(22) Filed: Nov. 26, 2014

(65) Prior Publication Data

US 2015/0148465 A1 May 28, 2015

(30) Foreign Application Priority Data

Nov. 27, 2013 (KR) .......................... 10-2013-0145674

(51) Int. Cl.
| | |
|---|---|
| *C08K 9/00* | (2006.01) |
| *C08K 5/5435* | (2006.01) |
| *C08K 5/549* | (2006.01) |
| *C08L 69/00* | (2006.01) |
| *C08K 5/5419* | (2006.01) |
| *C08K 9/04* | (2006.01) |
| *C08K 9/06* | (2006.01) |

(52) U.S. Cl.
CPC ............... *C08K 5/5435* (2013.01); *C08K 5/549* (2013.01); *C08K 5/5419* (2013.01); *C08K 9/04* (2013.01); *C08K 9/06* (2013.01); *C08L 69/00* (2013.01)

(58) Field of Classification Search
CPC .................................. C08K 5/549; C08L 69/00
See application file for complete search history.

(56) References Cited

U.S. PATENT DOCUMENTS

| | | | | |
|---|---|---|---|---|
| 5,691,401 | A | * 11/1997 | Morita | .................... C08J 3/128 523/435 |
| 5,792,812 | A | * 8/1998 | Fujiki | ................. B29C 45/1676 428/412 |
| 2004/0180193 | A1 | * 9/2004 | Oda | ....................... B82Y 30/00 428/328 |

* cited by examiner

*Primary Examiner* — Hannah Pak
(74) *Attorney, Agent, or Firm* — Additon, Higgins & Pendleton, P.A.

(57) ABSTRACT

A thermoplastic resin composition includes a thermoplastic resin including a polycarbonate resin; a siloxane compound represented by Formula 1; and surface-modified hydrophobic silica:

[Formula 1]

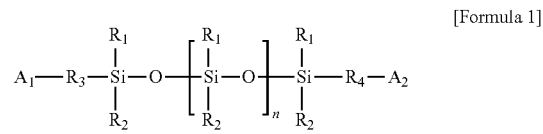

wherein $R_1$ and $R_2$ are the same or different and are each independently $C_1$ to $C_5$ alkyl; $R_3$ and $R_4$ are the same or different and are each independently $C_2$ to $C_{10}$ alkylene; $A_1$ and $A_2$ are the same or different and are each independently a glycidoxy group, an epoxy group, an amine group, a hydroxyl group, a hydrogen atom, a vinyl group, a (meth)acryloyl group, or an aryl group; and n is an integer from 2 to 80. The thermoplastic resin composition can exhibit excellent properties in terms of impact resistance, heat resistance, scratch resistance, surface gloss, mar resistance, and the like.

12 Claims, 1 Drawing Sheet

THERMOPLASTIC RESIN COMPOSITION AND MOLDED ARTICLE INCLUDING THE SAME

CROSS-REFERENCE TO RELATED APPLICATION

This application claims priority under 35 USC Section 119 to and the benefit of Korean Patent Application No. 10-2013-0145674, filed Nov. 27, 2013, the entire disclosure of which is incorporated herein by reference.

FIELD OF THE INVENTION

The present invention relates to a thermoplastic resin composition and a molded article including the same.

BACKGROUND

Polycarbonate resins exhibit excellent mechanical properties, impact resistance, thermal stability, self-extinguishability, dimensional stability, heat stability, and the like, and are used in the manufacture of electronic products, automotive components, lenses, glass substitute materials, and the like. However, polycarbonate resins exhibit extremely poor scratch resistance and suffer from yellowing when exposed to sunlight for a long period of time.

Polyester resins exhibit excellent mechanical properties, electrical properties, chemical resistance, moldability, scratch resistance, and the like. Accordingly, polyester resins can be used as a thermosetting resin for injection molding, a metal substitute material and the like, and are used in the manufacture of automotive components, electronic products and the like. However, polyester resins have a glass transition temperature from about 40° C. to about 60° C. and thus have low heat deflection temperature, and suffer from deterioration in impact resistance at room temperature and at low temperature.

High-gloss and high-impact products are generally subjected to painting and the like. However, painting requires multiple processes and has problems, such as high defect rate, generation of large amounts of toxic volatile components, increased costs, and the like. To solve such problems of painting, there has been a focus on the development of materials that do not require painting.

To use a certain material as a non-painted material, the material should have high gloss and exhibit excellent properties in terms of scratch resistance, impact resistance and the like. However, non-painted resins (materials), which have been developed in the art, do not satisfy many properties, such as realization of colors (colorability), impact resistance, heat resistance, scratch resistance, and the like, which are required for materials for high-gloss and high-impact resistant products. In addition, although polycarbonate/polyester alloys are used for materials requiring impact resistance, scratch resistance and the like, the polycarbonate/polyester alloys have limited use for high-gloss and high-impact resistant products due to low mar resistance thereof.

To improve gloss durability, coating methods such as silicone and vinyl compound coating, acrylic/melamine clear coating and the like, and additives such as slip additives, wax, inorganic fillers, nanoparticles and the like, may be used. However, there is a concern that these methods can cause deterioration in other properties such as color difference, impact resistance, heat resistance, and the like.

Therefore, there is a need for a thermoplastic resin composition that exhibits excellent properties in terms of impact resistance, heat resistance, scratch resistance, surface gloss, mar resistance, and the like.

SUMMARY

The present invention provides a thermoplastic resin composition that can exhibit excellent properties in terms of impact resistance, heat resistance, scratch resistance, surface gloss, mar resistance and the like, and a molded article including the composition.

The thermoplastic resin composition includes: a thermoplastic resin including a polycarbonate resin; a siloxane compound represented by Formula 1; and surface-modified hydrophobic silica,

[Formula 1]

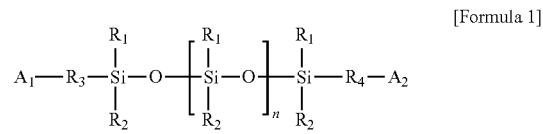

wherein $R_1$ and $R_2$ are the same or different and are each independently $C_1$ to $C_5$ alkyl; $R_3$ and $R_4$ are the same or different and are each independently $C_2$ to $C_{10}$ alkylene; $A_1$ and $A_2$ are the same or different and are each independently a glycidoxy group, an epoxy group, an amine group, a hydroxyl group, a hydrogen atom, a vinyl group, a (meth)acryloyl group, or an aryl group; and n is an integer from 2 to 80.

In one embodiment, the siloxane compound may be present in an amount of about 0.1 parts by weight to about 3 parts by weight based on about 100 parts by weight of the thermoplastic resin, and the surface-modified hydrophobic silica may be present in an amount of about 0.1 parts by weight to about 3 parts by weight based on about 100 parts by weight of the thermoplastic resin.

In one embodiment, a weight ratio of the siloxane compound to the surface-modified hydrophobic silica may range from about 1:0.5 to about 1:1.5.

In one embodiment, the thermoplastic resin may further include a polyester resin.

In one embodiment, the siloxane compound may be represented by Formula 1a:

[Formula 1a]

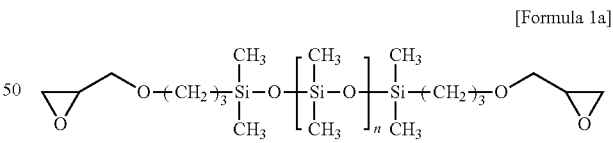

wherein n is an integer from 2 to 80.

In one embodiment, the surface-modified hydrophobic silica may include silica in which a hydroxyl group of a surface of silica is substituted with a hydrophobic group including at least one of $C_1$ to $C_8$ alkyl groups and silane compounds.

In one embodiment, the thermoplastic resin composition may have an Izod impact strength from about 14 kgf·cm/cm to about 80 kgf·cm/cm, as measured on an about ¼" thick specimen in accordance with ASTM D256.

In one embodiment, the thermoplastic resin composition may have a heat deflection temperature (HDT) from about 110° C. to about 150° C., as measured in accordance with ASTM D648.

In one embodiment, the thermoplastic resin composition may have a difference in 60° specular gloss (ΔGloss (60°)) from about −2 to about 5, as calculated through measurement on an about 10 cm×about 15 cm specimen using a crockmeter in accordance with ASTM D523 before and after the specimen is rubbed with predetermined white cotton cloths about 10 times.

The present invention also relates to a molded article formed from the above thermoplastic resin composition.

BRIEF DESCRIPTION OF THE DRAWINGS

FIG. 1 is a $^1$H-NMR spectrum of a siloxane compound prepared according to one embodiment of the present invention, as represented by Formula 1a.

DETAILED DESCRIPTION

Figure 1:
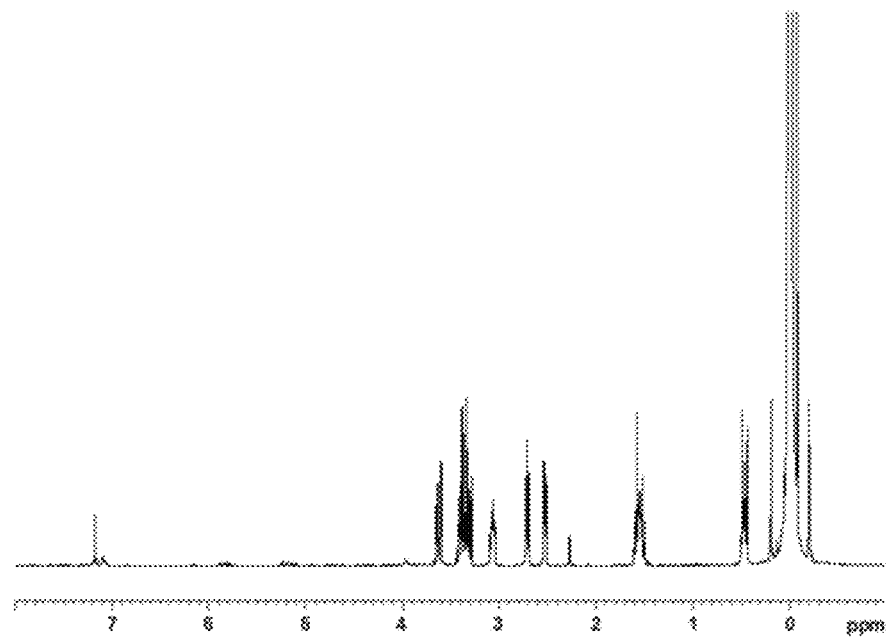

Exemplary embodiments now will be described more fully hereinafter in the following detailed description, with reference to the accompanying drawings, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

According to the present invention, a thermoplastic resin composition includes (A) a thermoplastic resin including a polycarbonate resin, (B) a siloxane compound including a functional group at both ends thereof, and (C) surface-modified hydrophobic silica.

(A) Thermoplastic Resin

According to the present invention, the thermoplastic resin includes a polycarbonate resin. The thermoplastic resin may include a polycarbonate resin alone, or may be a mixture of a polycarbonate resin and another thermoplastic resin other than the polycarbonate resin.

The polycarbonate resin is a typical thermoplastic polycarbonate resin. For example, the polycarbonate resin may be an aromatic polycarbonate resin prepared by reacting one or more diphenols (aromatic diol compounds) with a precursor such as phosgene, halogen formates, aromatic carbonates, and the like.

Examples of diphenols may include without limitation 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, and the like, and mixtures thereof. For example, the diphenol may include 2,2-bis(4-hydroxyphenyl)propane, 2,2-bis(3,5-dichloro-4-hydroxyphenyl)propane, and/or 1,1-bis(4-hydroxyphenyl)cyclohexane, for example 2,2-bis(4-hydroxyphenyl)propane, which is also referred to as bisphenol-A.

The polycarbonate resin may be a branched polycarbonate resin and may be prepared by, for example, reacting about 0.05 mol % to about 2 mol % of a polyfunctional compound containing tri- or higher functional groups, for example, tri or higher-valent phenol groups, based on the total amount of diphenols used in polymerization. In addition, the polycarbonate resin may be used in the form of a homo-polycarbonate resin, a co-polycarbonate resin, or blends thereof.

The polycarbonate resin may have a weight average molecular weight (Mw) from about 10,000 g/mol to about 200,000 g/mol, for example, from about 15,000 g/mol to about 80,000 g/mol, as measured by gel permeation chromatography (GPC). Within this range, the thermoplastic resin composition can exhibit excellent impact resistance, heat resistance, and the like.

The thermoplastic resin other than the polycarbonate resin may be a typical thermoplastic resin. Examples of the thermoplastic resin other than the polycarbonate resin can include without limitation polyester resins, aromatic vinyl resins, polyphenylene ether resins, acrylic resins, polyamide resins, polyolefin resins, and the like, and mixtures thereof. In exemplary embodiments, the thermoplastic resin other than the polycarbonate resin includes a polyester resin.

The polyester resin may be any polyester resin used for typical thermoplastic resin compositions without limitation. The polyester resin may be obtained by polycondensation of a dicarboxylic acid compound and a diol compound, which can be easily realized by those skilled in the art.

Examples of the dicarboxylic acid compound may include without limitation terephthalic acid (TPA), isophthalic acid (IPA), 1,2-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, 2,7-naphthalenedicarboxylic acid, aromatic dicarboxylates in which acid is substituted with a dimethyl group, such as dimethyl terephthalate (DMT) and dimethyl isophthalate, alkyl ester of naphthalenedicarboxylic acid, dimethyl-1,2-naphthalate, dimethyl-1,5-naphthalate, dimethyl-1,7-naphthalate, dimethyl-1,7-naphthalate, dimethyl-1,8-naphthalate, dimethyl-2,3-naphthalate, dimethyl-2,6-naphthalate, dimethyl-2,7-naphthalate, and the like, and mixtures thereof.

In addition, the diol compound may include $C_2$ to $C_{12}$ diols. Examples of the $C_2$ to $C_{12}$ diols may include without limitation ethylene glycol, 1,2-propylene glycol, 1,3-propylene glycol, 2,2-dimethyl-1,3-propanediol, 2,2-dimethyl-1,3-propylene glycol, 1,3-butanediol, 1,4-butanediol, 1,5-pentanediol, 1,5-pentanediol, 1,6-hexanediol, 1,3-cyclohexanedimethanol, 1,4-cyclohexanedimethanol, and the like, and mixtures thereof.

In some embodiments, the polyester resin may have an intrinsic viscosity from about 0.75 dl/g to about 1.50 dl/g, for example, from about 0.90 dl/g to about 1.12 dl/g as measured using a Ubbelohde viscometer in phenol and 1,2-dichlorobezene solution (solvent weight ratio: 50/50, solute concentration: 0.5 g/dl) at 25° C. Within this range, the thermoplastic resin composition can exhibit excellent scratch resistance, moldability, and the like.

In some embodiments, when the thermoplastic resin other than the polycarbonate resin, such as the polyester resin, is used, the thermoplastic resin other than the polycarbonate resin may be present in an amount of about 1% by weight (wt %) to about 30 wt %, for example, about 5 wt % to about 10 wt %, based on the total weight (100 wt %) of the thermoplastic resin (i.e., based on the total weight of the polycarbonate resin and the thermoplastic resin other than the polycarbonate resin). In some embodiments, the thermoplastic resin can include the thermoplastic resin other than the polycarbonate resin in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the thermoplastic resin other than the polycarbonate resin can be in a range from about any of the foregoing amounts to about any other of the foregoing amounts.

Within this range, the thermoplastic resin composition can exhibit further improved scratch resistance, mar resistance, and the like.

(B) Siloxane Compound

According to the present invention, the siloxane compound can reduce a surface friction coefficient of the thermoplastic resin composition (specimen), thereby improving mar resistance of the composition. For example, the siloxane compound may be represented by the following Formula 1:

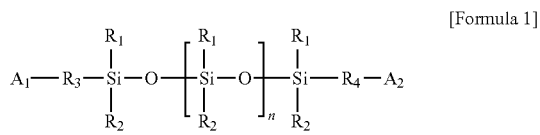

[Formula 1]

wherein $R_1$ and $R_2$ are the same or different and are each independently $C_1$ to $C_5$ alkyl, for example, methyl, ethyl, propyl, butyl, or the like, and as another example methyl; $R_3$ and $R_4$ are the same or different and are each independently $C_2$ to $C_{10}$ alkylene, for example, ethylene, propylene, butylene, pentylene, hexylene, or the like; $A_1$ and $A_2$ are the same or different and are each independently glycidoxy group, an epoxy group, an amine group, a hydroxyl group, a hydrogen atom, a vinyl group, a (meth)acryloyl group, or an aryl group, for example, a glycidoxy group; and n is an integer from 2 to 80, for example, an integer from 20 to 50.

In one embodiment, the siloxane compound may be prepared by reacting a siloxane compound (precursor) represented by Formula 2 with a compound (functional group) represented by Formula 3:

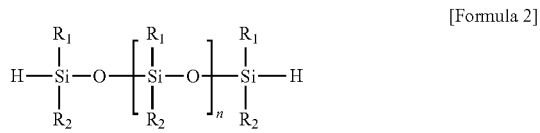

[Formula 2]

wherein $R_1$, $R_2$ and n are the same as defined in Formula 1;

$A_3$-$R_5$ [Formula 3]

wherein $A_3$ may be a glycidoxy group, an epoxy group, an amine group, a hydroxyl group, a hydrogen atom, a vinyl group, a (meth)acryloyl group, or an aryl group; and $R_5$ may be a $C_2$ to $C_{10}$ hydrocarbon group including a double bond at an end thereof, for example, a vinyl group ($CH_2$=CH—), an allyl group ($CH_2$=CH—$CH_2$—), and the like.

As used herein, the term $C_2$ to $C_{10}$ hydrocarbon group refers to substituted or unsubstituted $C_2$ to $C_{10}$ alkyl and/or substituted or unsubstituted $C_6$ to $C_{10}$ aryl including a double bond at an end thereof. Also as used herein, the term "substituted" means that at least one hydrogen is replaced with at least one of a halogen atom, a hydroxyl group, a nitro group, a cyano group, an amino group, an azido group, an amidino group, a hydrazino group, a carbonyl group, a carbamyl group, a thiol group, an ester group, a carboxyl group or salt thereof, a sulfonic acid group or salt thereof, a phosphate group or salt thereof, a $C_1$ to $C_{20}$ alkyl group, a $C_2$ to $C_{20}$ alkenyl group, a $C_2$ to $C_{20}$ alkynyl group, a $C_1$ to $C_{20}$ alkoxy group, a $C_6$ to $C_{30}$ aryl group, a $C_6$ to $C_{30}$ aryloxy group, a $C_3$ to $C_{30}$ cycloalkyl group, a $C_3$ to $C_{30}$ cycloalkenyl group, a $C_3$ to $C_{30}$ cycloalkynyl group, or a combination thereof.

The siloxane compound represented by Formula 2 may be prepared by adjusting n through reaction of a linear siloxane having n of 0 with a cyclic siloxane, without being limited thereto.

Here, the compound represented by Formula 3 may include at least two compounds including different $A_3$ and $R_5$. After reaction, $A_3$ and $R_5$ may represent $A_1$ and $A_2$, and $R_3$ and $R_4$ of the siloxane compound represented by Formula 1, respectively.

In one embodiment, the reaction may be performed in the presence of a catalyst. The catalyst may be a platinum-containing catalyst. For example, the catalyst may be a platinum element itself or a platinum-containing compound. Examples of the catalyst may include without limitation H2PtCl6, Pt2{[(CH2=CH)Me2Si]2O}3, Rh[(cod)2]BF4, Rh(PPh3)4Cl, Pt/C, and the like. These catalysts may be used alone or in combination thereof. For example, the catalyst may be Pt/C, for example, 10% Pt/C. The catalyst may to be present in an amount of about 10 ppm to about 500 ppm, for example, about 50 ppm to about 150 ppm, based on the total amount of the reactants.

The reaction may be performed in an organic solvent. Examples of the organic solvent may include without limitation 1,2-dichloroethane, toluene, xylene, dichlorobenzene, and the like, and mixtures thereof. For example, reaction may be performed in toluene.

In addition, reaction temperature and reaction time may be adjusted depending upon reactivity of the reactants (Formulae 2 and 3). For example, the reaction may be performed at a temperature from about 60° C. to about 140° C., for example from about 110° C. to about 120° C., for about 2 hours to about 12 hours, for example, about 3 hours to about 5 hours, without being limited thereto.

In one embodiment, the siloxane compound may be represented by Formula 1a:

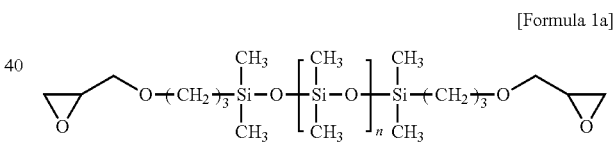

[Formula 1a]

wherein n is defined as in Formula 1.

In exemplary embodiments, the thermoplastic resin composition may include the siloxane compound in an amount of about 0.1 parts by weight to about 3 parts by weight, for example, about 0.2 parts by weight to about 2.5 parts by weight, and as another example about 0.3 parts by weight to about 2 parts by weight, based on about 100 parts by weight of the thermoplastic resin. In some embodiments, the thermoplastic resin composition may include the siloxane compound in an amount of about 0.1, 0.2, 0.3, 0.4, 0.5, 0.6, 0.7, 0.8, 0.9, 1, 1.5, 2, 2.5, or 3 parts by weight. Further, according to some embodiments of the present invention, the amount of siloxane compound can be in a range from about any of the foregoing amounts to about any other of the foregoing amounts.

Within this range, the thermoplastic resin composition can exhibit excellent properties in terms of impact resistance, heat resistance, scratch resistance, surface gloss, mar resistance, and the like.

(C) Surface-Modified Hydrophobic Silica

According to the present invention, the surface-modified hydrophobic silica can improve color difference (surface gloss) of the thermoplastic resin composition by adjusting an index of refraction of the composition, and may include any typical commercially available surface-modified hydrophobic silica. For example, the surface-modified hydrophobic silica may be silica in which at least some hydroxyl groups of a surface of the silica are substituted with a hydrophobic group such as $C_1$ to $C_8$ alkyl groups, silane compounds (coupling agents) including PDMS, and the like.

In some embodiments, the surface-modified hydrophobic silica may have an average particle size of about 40 nm or less, for example, from about 10 nm to about 20 nm; and a BET surface area from about 90 $m^2/g$ to about 290 $m^2/g$, for example, from about 100 $m^2/g$ to about 200 $m^2/g$, without being limited thereto.

In some embodiments, the thermoplastic resin composition may include the surface-modified hydrophobic silica in an amount of about 0.1 parts by weight to about 3 parts by weight, for example, about 0.2 parts by weight to about 2.5 parts by weight, and as another example about 0.3 parts by weight to about 2 parts by weight, based on about 100 parts by weight of the thermoplastic resin. In some embodiments, the thermoplastic resin composition may include the surface-modified hydrophobic silica in an amount of about 0.1, 0.2, 0.3, 0.4, 0.5, 0.6, 0.7, 0.8, 0.9, 1, 1.5, 2, 2.5, or 3 parts by weight. Further, according to some embodiments of the present invention, the amount of surface-modified hydrophobic silica can be in a range from about any of the foregoing amounts to about any other of the foregoing amounts.

Within this range, the thermoplastic resin composition can exhibit excellent properties in terms of impact resistance, heat resistance, scratch resistance, surface gloss, mar resistance, and the like.

In some embodiments, a weight ratio of the siloxane compound to the surface-modified hydrophobic silica (siloxane compound:silica) may range from about 1:0.5 to about 1:1.5, for example, from about 1:0.7 to about 1:1.3. Within this range, the thermoplastic resin composition can exhibit further improved scratch resistance, surface gloss, mar resistance, and the like.

According to the present invention, the thermoplastic resin composition may further include one or more typical additives. Examples of the additives may include, without limitation, flame retardants, flame retardant aids, lubricants, plasticizers, heat stabilizers, anti-dripping agents, antioxidants, photostabilizers, pigments, dyes, and the like, as needed. These additives may be used alone or in combination thereof. For example, the additives may be present in an amount of about 0.1 parts by weight to about 10 parts by weight, based on about 100 parts by weight of the thermoplastic resin, without being limited thereto.

According to the present invention, the thermoplastic resin composition may be prepared in pellet form by mixing the above components, followed by melt extrusion at about 200° C. to about 280° C., for example, about 250° C. to about 260° C. using a typical twin-screw extruder.

The pellets may be formed into various molded articles through various molding methods such as injection molding, extrusion, vacuum molding, cast molding, and the like. These molding methods are well known among those of ordinary skill in the art.

In some embodiments, the thermoplastic resin composition may have an Izod impact strength from about 14 kgf·cm/cm to about 80 kgf·cm/cm, for example, from about 15 kgf·cm/cm to about 70 kgf·cm/cm, as measured on an about ¼" thick specimen in accordance with ASTM D256.

The thermoplastic resin composition may have a heat deflection temperature (HDT) from about 110° C. to about 150° C., for example, from about 120° C. to about 140° C., as measured in accordance with ASTM D648.

The thermoplastic resin composition may have a difference in 60° specular gloss (ΔGloss (60°)) from about −2 to about 5, for example, from about −2 to about 1.5, as calculated through measurement on an about 10 cm×about 15 cm specimen using a crockmeter in accordance with ASTM D523 before and after the specimen is rubbed with predetermined white cotton cloths about 50 times or more, for example, about 100 times or more.

The thermoplastic resin composition may have a falling dart impact (FDI) strength (crack generation energy) of about 40 J or more, for example, from about 40 J to about 50 J, specifically from about 44 J to about 46 J, as measured on an about 3 mm thick specimen (about 10 cm×about 10 cm×about 3 mm) using an about 5 kg dart from a height of about 1 m in accordance with the DuPont drop measurement method, in which a maximum height not generating a crack is measured by adjusting a height of the dart, followed by converting the maximum height into potential energy. Here, the maximum height not generating a crack is found in such a manner that a dart having a certain weight is dropped onto an about 1 mm thick specimen from a varying height, followed by observing whether a crack is generated in the specimen by the naked eye.

In addition, the thermoplastic resin composition may have a specular component included (SCI) reflectance (L*measurement) of about 32 or less, for example, from about 28 to about 31; a specular component excluded (SCE) reflectance (L*measurement) of about 8.7 or less, for example, from about 2.0 to about 8.1, as measured on an about 10 cm×about 15 cm specimen using a colorimeter.

According to the present invention, a molded article can be formed from the above thermoplastic resin composition through various molding methods. Since the molded article can exhibit excellent properties in terms of impact resistance, heat resistance, scratch resistance, surface gloss, mar resistance, and the like, the molded article can be useful for interior/exterior materials for electronic products and automobiles, and the like.

Hereinafter, the present invention will be described in more detail with reference to the following examples. It should be understood that these examples are provided for illustration only and are not to be construed in any way as limiting the present invention. A description of details apparent to those skilled in the art will be omitted for clarity.

EXAMPLE

Details of components used in Examples and Comparative Examples are as follows.

(A) Thermoplastic Resin (A1) Polycarbonate resin: Bisphenol-A polycarbonate (PC, weight average molecular weight: 28,000 g/mol) is used.

(A2) Polyester resin: Polybutylene terephthalate (PBT, Shinite K001, SHINKONG Co., Ltd.) is used.

(A3) Polyester resin: Polytrimethylene terephthalate (PTT, Sorona, DuPont Co., Ltd.) is used.

Figure 2:
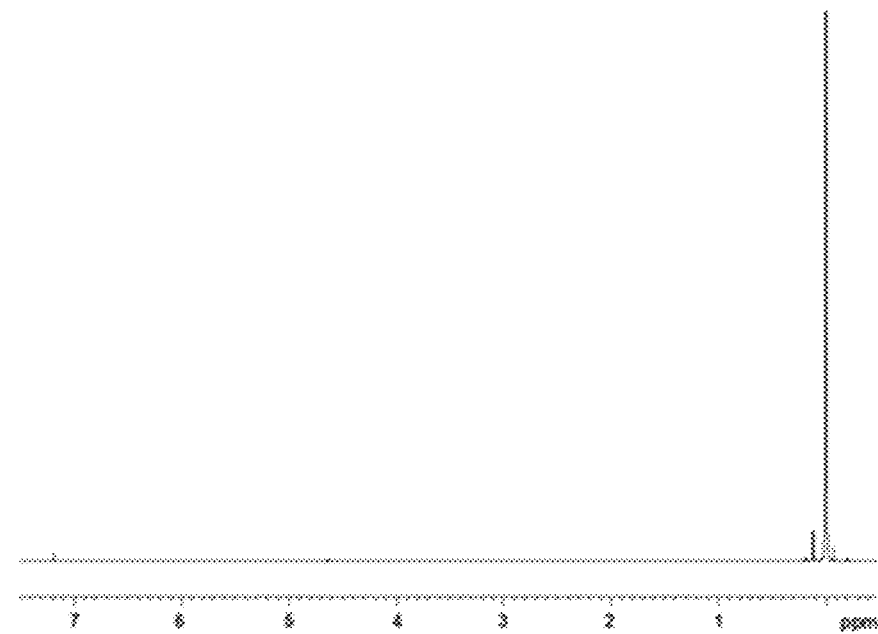
FIG. 2 is a $^1$H-NMR spectrum of a siloxane compound prepared according to one embodiment of the present invention, as represented by Formula 2.

(B) Siloxane Compound (B1) A siloxane compound (n=20) represented by Formula 1a and prepared by reacting allyl glycidyl ether with a siloxane compound (n=20), which is represented by Formula 2 and prepared through reaction of tetramethyldisiloxane (HMM) and octamethylcyclotetrasiloxane in a mole ratio of 1:4, is used. $^1$H-NMR spectra of the prepared siloxane compounds represented by Formulae 1a and 2 are shown in FIGS. 1 and 2, respectively.

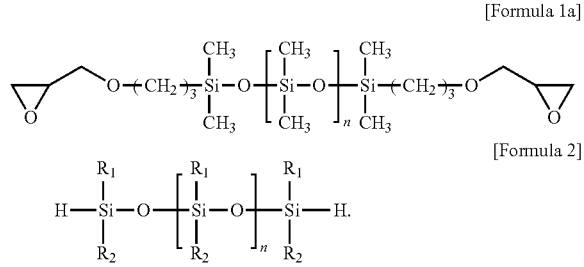

[Formula 1a]

[Formula 2]

$$H-\underset{R_2}{\underset{|}{Si}}-O\left[\underset{R_2}{\underset{|}{Si}}-O\right]_n\underset{R_2}{\underset{|}{Si}}-H.$$

(B2) A siloxane compound (n=50) represented by Formula 1a and prepared by reacting allyl glycidyl ether with a siloxane compound (n=50), which is represented by Formula 2 and prepared through reaction of tetramethyldisiloxane (HMM) and octamethylcyclotetrasiloxane in a mole ratio of 1:10, is used.

(C) Silica (C1) Silica subjected to surface modification (substitution) with a methyl group (Aerosil R972, Evonik Co., Ltd.) is used.

(C2) Silica subjected to no surface modification (Aerosil 130, Evonik Co., Ltd.) is used.

Examples 1 to 8 and Comparative Examples 1 to 14

The prepared components are added in amounts as listed in Tables 1 to 3, respectively, followed by extrusion at 200° C. to 280° C., thereby preparing pellets. Here, extrusion is performed using a twin-screw extruder having L/D=36 and a diameter of 45 mm. The prepared pellets are dried at 80° C. to 100° C. for 4 hours or more, followed by injection molding in an injection machine (molding temperature: 290° C., mold temperature: 90° C.), thereby preparing specimens. Each of the prepared specimens is evaluated as to the following properties. Results are shown in Tables 1 to 3.

Evaluation of Properties (1) Mar resistance: 60° specular gloss is measured on 10 cm×15 cm specimens using a crockmeter in accordance with ASTM D523 before rubbing and after rubbing with predetermined white cotton cloths 10 times, 50 times, and 100 times, respectively, followed by calculating a difference in 60° specular gloss (ΔGloss (60°)) between before and after rubbing.

(2) Heat resistance: Heat deflection temperature (HDT, unit: ° C.) is measured in accordance with ASTM D648.

(3) Impact resistance: Izod impact strength (unit: kgf·cm/cm) is measured on ¼" thick and ⅛" thick notched Izod specimens in accordance with ASTM D256.

(4) Color difference: Specular component included (SCI) reflectance and specular component excluded (SCE) reflectance are measured on a 10 cm×15 cm specimen using a colorimeter (model: CM-3600d, MINOLTA Co., Ltd.).

(5) Falling dart impact (FDI) strength (unit: J): FDI strength is measured by measuring a height generating a crack in a 3 mm thick specimen (10 cm×10 cm×3 mm) using a 5 kg dart from a height of 1 m in accordance with the DuPont drop measurement method, followed by converting the height into energy.

TABLE 1

| | | Example | | | | | | | |
|---|---|---|---|---|---|---|---|---|---|
| | | 1 | 2 | 3 | 4 | 5 | 6 | 7 | 8 |
| (A) | (A1) (wt %) | 100 | 100 | 100 | 100 | 100 | 95 | 95 | 95 |
| | (A2) (wt %) | — | — | — | — | — | 5 | 5 | — |
| | (A3) (wt %) | — | — | — | — | — | — | — | 5 |
| (B) | (B1) | — | — | — | 1.5 | 1.5 | 1.0 | 1.0 | — |
| (parts by weight) | (B2) | 1.5 | 1.5 | 1.5 | — | — | — | — | 1.5 |
| (C1) (parts by weight) | | 0.5 | 1.0 | 1.5 | 1.5 | 2.0 | 0.5 | 1.0 | 1.5 |
| Difference in gloss | 10 times | −0.7 | −0.3 | 0.3 | −0.1 | 0.0 | 0.1 | 0.1 | −2.0 |
| (ΔGloss (60°)) | 50 times | 0.3 | 0.6 | 1.1 | 0.1 | −0.3 | 0.1 | 0.2 | −1.8 |
| | 100 times | 0.5 | 0.7 | 0.7 | 0.0 | 0.2 | 0.2 | 0.2 | −1.0 |
| Heat deflection temperature (° C.) | | 129 | 132 | 131 | 129 | 128 | 121 | 120 | 125 |
| IZOD impact strength | ⅛" | 85 | 88 | 87 | 85 | 82 | 86 | 81 | 84 |
| (kgf · cm/cm) | ¼" | 21 | 20 | 22 | 18 | 26 | 15 | 16 | 69 |
| SCI/100 - L* | | 30.077 | 28.556 | 28.175 | 29.121 | 28.466 | 29.602 | 29.095 | 29.984 |
| SCE/100 - L* | | 8.383 | 3.653 | 2.042 | 4.715 | 2.562 | 6.592 | 4.883 | 8.460 |
| FDI strength | | 44 | 45 | 45 | 45 | 45 | 46 | 46 | 45 |

TABLE 2

| | | Comparative Example | | | | | | | |
|---|---|---|---|---|---|---|---|---|---|
| | | 1 | 2 | 3 | 4 | 5 | 6 | 7 | 8 |
| (A) | (A1) (wt %) | 100 | 100 | 100 | 100 | 100 | 100 | 100 | 100 |
| | (A2) (wt %) | — | — | — | — | — | — | — | — |
| | (A3) (wt %) | — | — | — | — | — | — | — | — |
| (B) | (B1) | — | — | — | — | — | 1.5 | — | 1.5 |
| (parts by weight) | (B2) | — | — | — | — | 1.5 | — | — | — |
| (C) | (C1) | — | 0.5 | 1.0 | 1.5 | — | — | — | — |
| (parts by weight) | (C2) | — | — | — | — | — | — | 2.0 | 2.0 |
| Difference in gloss | 10 times | 1.0 | 0.1 | 1.3 | 0.7 | 1.5 | −0.5 | 1.4 | 0.3 |
| (ΔGloss (60°)) | 50 times | 5.5 | 5.9 | 4.1 | 5.4 | 1.2 | −0.2 | 6.2 | 2.0 |
| | 100 times | 10.2 | 9.6 | 15.2 | 13.1 | 6.2 | 0.2 | 15.6 | 9.3 |

TABLE 2-continued

| | Comparative Example | | | | | | | |
|---|---|---|---|---|---|---|---|---|
| | 1 | 2 | 3 | 4 | 5 | 6 | 7 | 8 |
| Heat deflection temperature (° C.) | 130 | 129 | 129 | 129 | 128 | 129 | 129 | 130 |
| IZOD impact strength (kgf·cm/cm) 1/8" | 88 | 87 | 85 | 84 | 65 | 84 | 76 | 78 |
| 1/4" | 11 | 10 | 10 | 10 | 12 | 12 | 7 | 11 |
| SCI/100 - L* | 27.895 | 27.907 | 27.884 | 27.936 | 30.350 | 31.336 | 28.287 | 28.672 |
| SCE/100 - L* | 0.305 | 0.415 | 0.655 | 1.750 | 8.456 | 10.829 | 6.947 | 8.171 |
| FDI strength | 46 | 46 | 46 | 46 | 46 | 46 | 46 | 46 |

TABLE 3

| | | Comparative Example | | | | | |
|---|---|---|---|---|---|---|---|
| | | 9 | 10 | 11 | 12 | 13 | 14 |
| (A) | (A1) (wt %) | 95 | 95 | 95 | 95 | 95 | 95 |
| | (A2) (wt %) | 5 | 5 | 5 | 5 | — | — |
| | (A3) (wt %) | — | — | — | — | 5 | 5 |
| (B) (parts by weight) | (B1) | — | — | — | 1.0 | — | — |
| | (B2) | — | — | — | — | — | 1.5 |
| (C1) (parts by weight) | | — | 0.5 | 1.0 | — | — | — |
| Difference in gloss (ΔGloss (60°)) | 10 times | 2.3 | 0.8 | 0.9 | 0.1 | 0.9 | -0.3 |
| | 50 times | 6.5 | 3.6 | 7.9 | 0.5 | 4.7 | 0.1 |
| | 100 times | 10.3 | 10.3 | 10.8 | 0.0 | 9.5 | -0.1 |
| Heat deflection temperature (° C.) | | 119 | 121 | 121 | 121 | 125 | 124 |
| IZOD impact strength (kgf·cm/cm) | 1/8" | 87 | 88 | 81 | 81 | 87 | 82 |
| | 1/4" | 22 | 13 | 14 | 13 | 15 | 20 |
| SCI/100 - L* | | 28.850 | 28.845 | 28.666 | 30.510 | 29.289 | 32.642 |
| SCE/100 - L* | | 3.860 | 3.630 | 3.102 | 9.794 | 5.144 | 15.335 |
| FDI strength | | 45 | 46 | 46 | 45 | 46 | 46 |

From the results, it can be seen that the thermoplastic resin composition according to the present invention exhibits excellent properties in terms of impact resistance, heat resistance, scratch resistance, surface gloss, mar resistance, and the like.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims.

What is claimed is:

1. A thermoplastic resin composition comprising:
a thermoplastic resin comprising a polycarbonate resin;
a siloxane compound represented by Formula I; and
surface-modified hydrophobic silica,

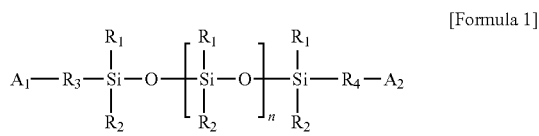

[Formula 1]

wherein $R_1$ and $R_2$ are the same or different and are each independently $C_1$ to $C_5$ alkyl; $R_3$ and $R_4$ are the same or different and are each independently $C_2$ to $C_{10}$ alkylene; $A_1$ and $A_2$ are the same or different and are each independently a glycidoxy group, an epoxy group, an amine group, a hydroxyl group, a vinyl group, a (meth)acryloyl group, or an aryl group; and n is an integer from 2 to 80, wherein the thermoplastic resin composition has an Izod impact strength from about 14 kgf·cm/cm to about 80 kgf·cm/cm, as measured on about 1/4" thick specimen in accordance with ASTM D256.

2. The thermoplastic resin composition according to claim 1, comprising the siloxane compound in an amount of about 0.1 parts by weight to about 3 parts by weight based on about 100 parts by weight of the thermoplastic resin, and comprising the surface-modified hydrophobic silica in an amount of about 0.1 parts by weight to about 3 parts by weight based on about 100 parts by weight of the thermoplastic resin.

3. The thermoplastic resin composition according to claim 1, comprising a weight ratio of the siloxane compound to the surface-modified hydrophobic silica of about 1:0.5 to about 1:1.5.

4. The thermoplastic resin composition according to claim 1, wherein the thermoplastic resin further comprises a polyester resin.

5. The thermoplastic resin composition according to claim 1, wherein the siloxane compound is represented by Formula 1a:

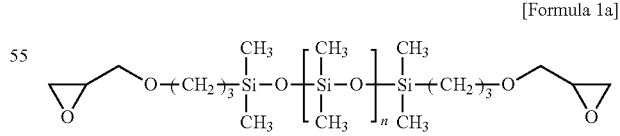

[Formula 1a]

wherein n is an integer from 2 to 80.

6. The thermoplastic resin composition according to claim 1, wherein the surface-modified hydrophobic silica comprises silica in which a hydroxyl group of a surface of silica is substituted with a hydrophobic group comprising at least one of $C_1$ to $C_8$ alkyl groups and silane compounds.

7. The thermoplastic resin composition according to claim 1, wherein the thermoplastic resin composition also has a heat deflection temperature (HDT) from about 110° C. to about 150° C., as measured in accordance with ASTM D648.

8. The thermoplastic resin composition according to claim 1, wherein the thermoplastic resin composition also has a difference in 60° specular gloss (Gloss)(60°) from about −2 to about 5, as calculated through measurement on an about 10 cm×about 15 cm specimen using a crockmeter in accordance with ASTM D523 before and after the specimen is rubbed with predetermined white cotton cloths about 10 times.

9. A molded article formed from the thermoplastic resin composition according to claim 1.

10. The thermoplastic resin composition according to claim 1, wherein in Formula 1, $A_1$ and $A_2$ are the same or different and are each independently a glycidoxy group, an epoxy group, an amine group, a hydroxyl group, a (meth) acryloyl group, or an aryl group.

11. The thermoplastic resin composition according to claim 1, wherein Formula 1, $A_1$ and $A_2$ are the same or different and are each independently a glycidoxy group, an epoxy group, an amine group, a hydroxyl group, or a (meth) acrylolyl group.

12. The thermoplastic resin composition according to claim 1, wherein in Formula 1, $A_1$ and $A_2$ are each a glycidoxy group.

* * * * *